(12) United States Patent
Briefer et al.

(10) Patent No.: US 6,257,068 B1
(45) Date of Patent: Jul. 10, 2001

(54) CAPACITIVE PRESSURE SENSOR HAVING PETAL ELECTRODES

(75) Inventors: Dennis K. Briefer, Berlin; Gino A. Pinto, Milford, both of MA (US)

(73) Assignee: Setra Systems, Inc., Boxboro, MA (US)

( * ) Notice: Subject to any disclaimer, the term of this patent is extended or adjusted under 35 U.S.C. 154(b) by 0 days.

(21) Appl. No.: 09/440,247

(22) Filed: Nov. 15, 1999

(51) Int. Cl.$^7$ ................. G01L 9/12; H01G 7/00

(52) U.S. Cl. ................ 73/718; 73/724; 361/283.4

(58) Field of Search .................... 73/724, 718, 715; 361/283.4, 290, 292

(56) References Cited

U.S. PATENT DOCUMENTS

| | | | |
|---|---|---|---|
| 4,408,194 | * 10/1983 | Thompson | 340/626 |
| 4,784,577 | * 11/1988 | Riston et al. | 417/219 |
| 4,944,187 | * 7/1990 | Frick et al. | 73/718 |
| 5,194,819 | * 3/1993 | Briefer | 324/684 |

* cited by examiner

*Primary Examiner*—Benjamin R. Fuller
*Assistant Examiner*—Abdullahi Aw-musse
(74) *Attorney, Agent, or Firm*—McDermott, Will & Emery

(57) ABSTRACT

A capacitive pressure sensor includes a housing element, a first electrode assembly and a second electrode assembly. The first electrode assembly includes a deformable elastic member, and a plurality of petal electrodes. The petal electrodes are attached to the elastic member and extend from the elastic member in a direction which is substantially perpendicular to the surface of the elastic member. The elastic member of the first electrode assembly is secured at its perimeter to the housing element at an aperture in the housing, so that the petal electrodes are enclosed within the housing. The second electrode assembly is also enclosed within the housing and is surrounded by the elongated electrodes. The spatial relationship between the petal electrodes and the second electrode assembly is directly related to the capacitance measured between them. As pressure is applied to the outer surface of the elastic member, the elastic member deflects and causes the spatial relationship between the petal electrodes and the second electrode to change, which causes the capacitance measured between them to change.

29 Claims, 11 Drawing Sheets

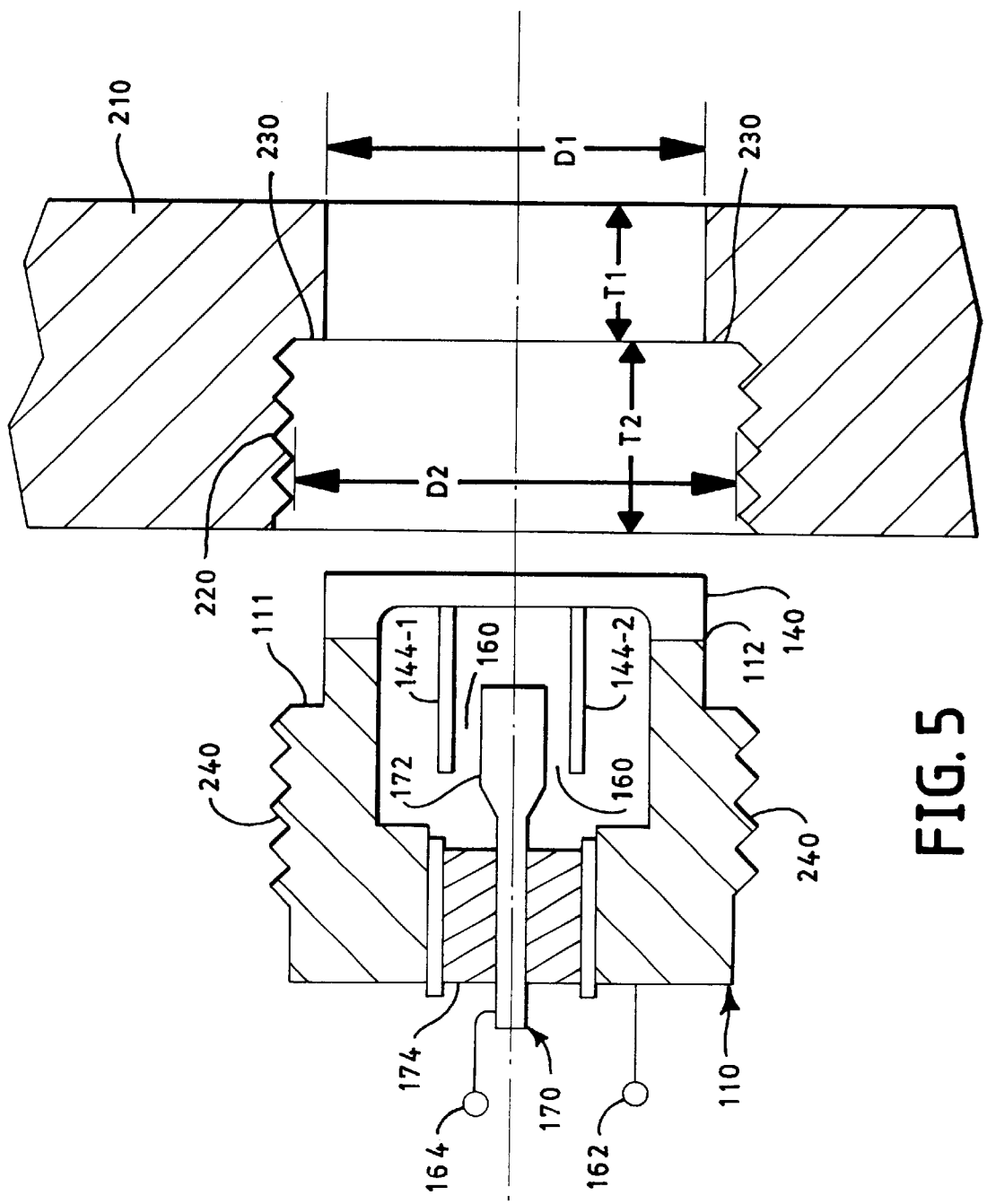

CAPACITIVE PRESSURE SENSOR HAVING PETAL ELECTRODES

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates to a pressure sensor, and more particularly, a pressure sensor which relies on changes in capacitance to indicate pressure fluctuations.

BACKGROUND OF THE INVENTION

Capacitive pressure sensors are well known in the prior art. Such sensors typically include a fixed element having a rigid, planar conductive surface forming one plate of a substantially parallel plate capacitor. A displacable (relative to the fixed element) conductive member, such as a metal foil diaphragm, forms the other plate of the capacitor. Generally, the diaphragm is edge-supported so that a central portion is substantially parallel to and opposite the fixed plate. Because the sensor generally has the form of a parallel plate capacitor, the characteristic capacitance C of the sensor is approximated by the equation:

$$C = \frac{\epsilon A}{d} \quad (1)$$

where $\epsilon$ is the permittivity of the material between the parallel plates, A is the surface area of the parallel plate and d represents the gap between the plates. The characteristic capacitance is inversely proportional to the gap between a central portion of the diaphragm and the conductive surface of the fixed element. In order for there to permit a pressure differential across the diaphragm, the region on one side of the diaphragm is sealed from the region on the opposite side.

In practice, the diaphragm elasticity is selected so that pressure differentials across the diaphragm in a particular range of the interest cause displacements of the central portion of the diaphragm. These pressure differential-induced displacements result in corresponding variations in the gap, d, between the two capacitor plates, and thus in capacitance variations produced by the sensor capacitor. For relatively high sensitivity, such sensors require large changes of capacitance in response to relatively small gap changes. Regarding equation (1), if $\epsilon$ and A are held constant, the greatest slope of the d verses C plot occurs when d is small. Thus for the greatest sensitivity, the gap is made as small as possible when the device is in equilibrium and the sensor is designed so that the gap d decreases as pressure is applied. The multiplicative effect of $\epsilon$ and A increases the sensitivity of the d to C relationship, so $\epsilon$ and A are maximized to achieve the highest possible sensitivity.

In high pressure applications, the diaphragm must have a relatively small diameter and be relatively rigid to prevent rupture at the high pressure interface. The small diameter reduces A in equation (1) relative to conventional sensors, and the rigidity of the diaphragm reduces the range of d. These characteristics together tend to reduce the sensitivity of conventional sensors in high pressure applications.

There is therefore a need for a high pressure capacitive sensor that can attain the levels of sensitivity currently demonstrated by conventional capacitive sensors used in relatively low pressure environments.

It is therefore an object of the invention to provide a high pressure capacitive sensor that can attain the levels of sensitivity currently demonstrated by conventional capacitive sensors which are designed to operate in relatively low pressure environments.

Other objects and advantages of the present invention will become apparent upon consideration of the appended drawings and description thereof.

SUMMARY OF THE INVENTION

The foregoing and other objects are achieved by the invention which in one aspect comprises a capacitive pressure sensor for use in high pressure applications, such as injection molding and plastic extrusion. The capacitive pressure sensor includes a rigid housing disposed about a central axis, with at least one aperture extending about the central axis in a plane perpendicular to the axis. The sensor further includes a first electrode assembly which spans the aperture of the housing and is secured to the housing at the electrode's perimeter. This electrode consists of a planar, electrically conductive elastic member with multiple petal electrodes extending substantially perpendicularly from a first side of the elastic member's surface from locations disposed about the central axis. These electrodes are sometimes referred to below as "petal" electrodes. A second side of the elastic member is exposed to the environment whose pressure is to be measured. When secured to the housing, the first electrode is oriented so that its petal electrodes are enclosed within the housing. The sensor further includes a second central electrode assembly which extends along the central axis and has a conductive portions on its outer surface disposed about the central axis. The central electrode is positioned so that it is surrounded by the petal electrodes and at least a portion of each petal electrode overlaps the conductive surface of the central electrode along the central axis. All of the petal electrodes are electrically connected to each other so that each in effect forms a capacitor with its underlying portion of the central electrode, where all of the capacitors are coupled in parallel. As a consequence, the total capacitance between the group of petal electrodes and the central electrode is the sum of the capacitance between each of the petal electrodes and the central electrode.

The entire sensor is positioned so that the elastic member is disposed between two isolated regions. As pressure on the second side of the elastic member increases relative to that on the first side, the elastic member deforms so that the side from which the petal electrodes becomes convex, causing the petal attachment point to displace and rotate. This rotation causes the distal tip of the petal electrodes to spread apart, and thus away from the second electrode's conductive surface. As the petal electrodes spread, the distance d measured from each petal electrode to the central electrode increases, but not necessarily in a uniform manner. The spreading causes the end of the petal electrode not attached to the elastic member (i.e. its distal tip) to be farther away from the central electrode than the end of the petal electrode attached to the elastic member. Because of this distinctive geometry, the resulting capacitance cannot be represented by a simple mathematical representation such as equation (1) for the parallel plate configuration. However, similar to a parallel plate capacitor, the resulting capacitance between a given point along a petal electrode and the central electrode varies directly with permittivity ε and the area A, and varies inversely with the distance d between them. Relatively long petal electrodes result in a correspondingly large amount of surface area exposed to the central electrode relative to the elastic member surface area, and a small deflection in the elastic member results in a relatively large change in distance between the petal electrode and the central electrode, especially at the end of the petal electrode not attached to the elastic member. The result of this configuration is a large change in capacitance for a relatively small elastic member deflection.

BRIEF DESCRIPTION OF DRAWINGS

The foregoing and other objects of this invention, the various features thereof, as well as the invention itself, may be more fully understood from the following description, when read together with the accompanying drawings in which:

FIG. 5 shows one form of the invention installed in one of the invention's intended applications;

DESCRIPTION OF THE PREFERRED EMBODIMENTS

Figure 1:
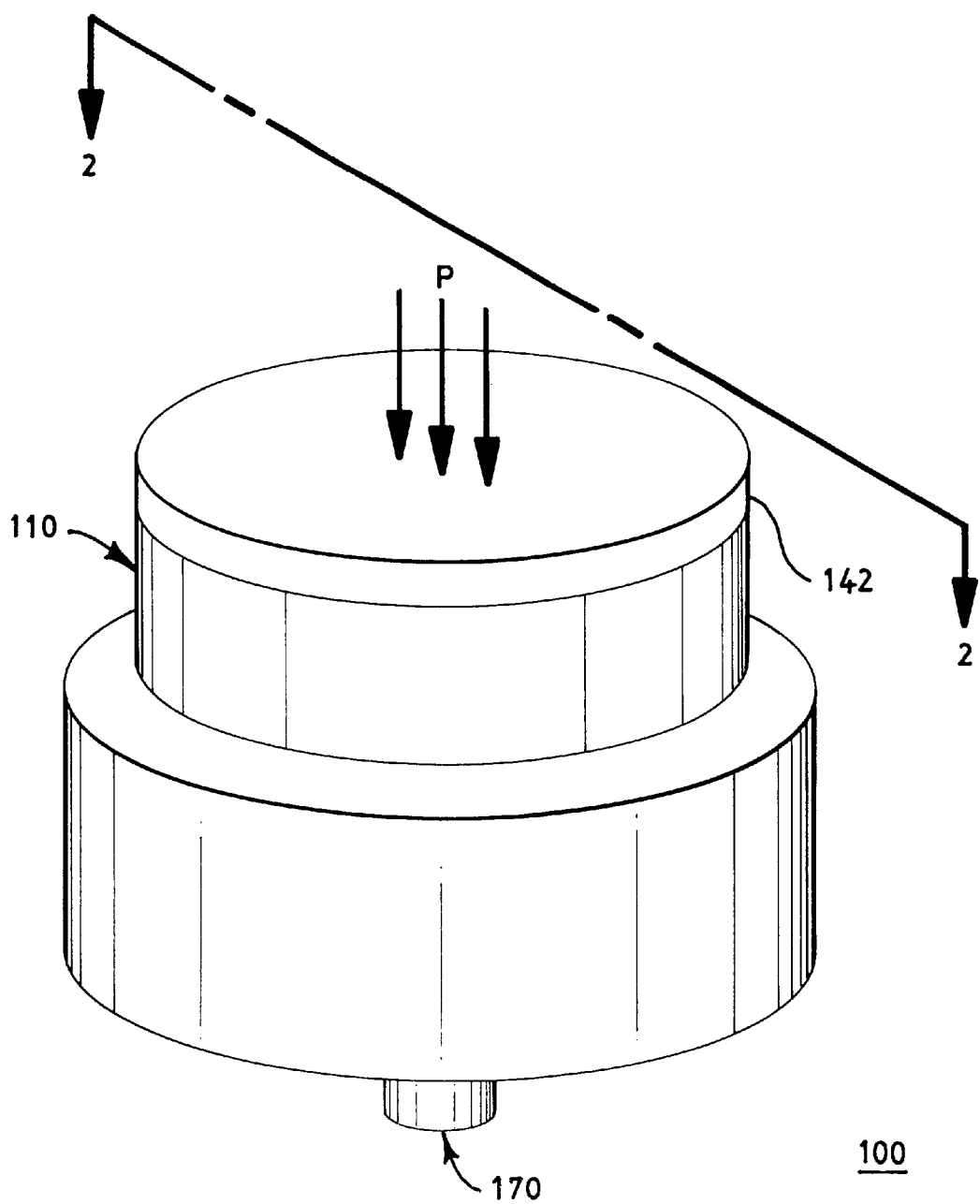
FIG. 1 shows in perspective one form of a pressure sensor constructed in accordance with one form of the present invention.
Figure 2:
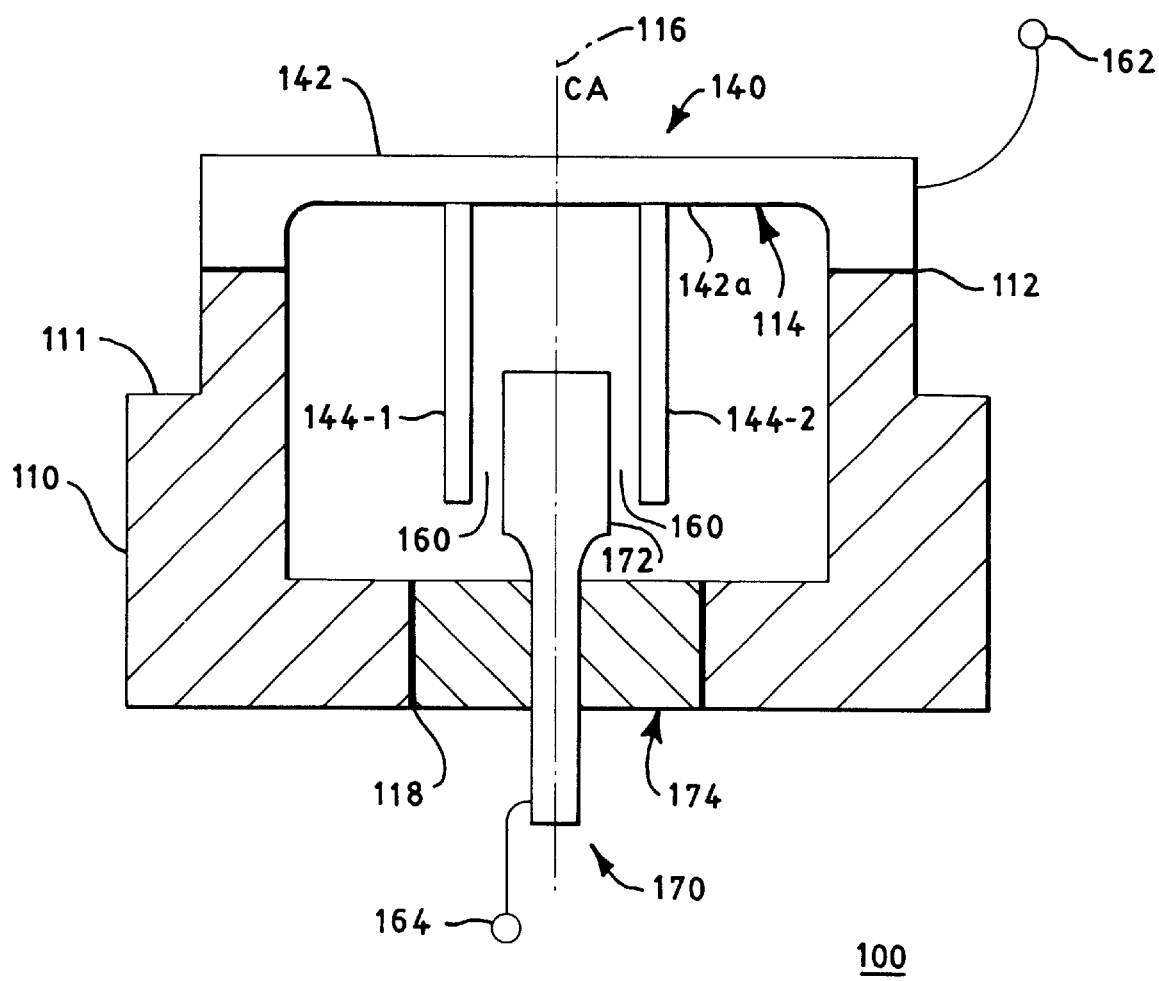
FIG. 2 shows a sectional view of the pressure sensor shown in FIG. 1.

FIG. 1 and FIG. 2 show one embodiment of a capacitive pressure sensor 100 constructed in accordance with the present invention, which produces a characteristic capacitance proportional to applied pressure. FIG. 1 shows, in perspective, one form of the invention, and FIG. 2 shows a sectional view along lines 2—2 of the pressure sensor shown in FIG. 1.

Sensor 100 includes a housing element 110, a first electrode assembly 140 and a second electrode assembly 170. The housing element 110 extends along a central axis CA and is generally axisymmetric about that axis, with an aperture 114 at one end. The electrode assembly 140 includes a conductive elastic member (or diaphragm) 142 which spans aperture 114 and is sealingly coupled to housing element 110. A plurality of petal electrodes 144-1 through 144-n (only two are shown, 144-1 and 144-2, in FIG. 2) from the inner surface 142a of member 142 in a symmetrical manner about axis CA, although other arrangements may be used. A central electrode 172 extends along the central axis CA. In the illustrated embodiment, elements 142 and 144-1 through 144-n are all made of electrically conductive material, but in other embodiments, non-conductive materials may be used which conductive regions at critical locations including the distal tips of the petal electrodes. A first electrode terminal 162, located external to the sensor 100, is electrically coupled to the plurality of petal electrodes, and a second electrode terminal 164, located external to the sensor, is electrically coupled to the central electrode 172. First terminal 162 and second terminal 164 permit the capacitance between the first and second electrodes to be measured external to the sensor 100.

The first electrode assembly 140 and the second electrode assembly 170 are positioned in a manner such that a gap 160 exists between the petal electrodes of the first electrode assembly 140 and the central electrode of second electrode assembly 170. The housing element 110 includes a rigid axisymmetric housing disposed symmetrically about a housing central axis 116, although those skilled in the art will realize that other housing element 110 shapes may be used. The housing element 110 has a first aperture 114 lying in a first plane substantially perpendicular to, and extending symmetrically about, the housing central axis 116. A joint 112 is formed between the first electrode assembly 140 and the housing element 110. The housing element 110 has a second aperture 118 to facilitate access to electrical signals generated by the first electrode assembly 140 and the second electrode assembly 170. The second aperture 118 may house and support the second electrode assembly 170, although those skilled in the art will recognize that the second electrode assembly other forms of support for the second electrode assembly are possible. In one form of the invention, the second aperture 118 lies in a plane substantially parallel to the first aperture 114, as shown in FIGS. 1 and 2, although other locations of the aperture 118 may be used. In one embodiment of the invention, the base member is made of machined metal, preferably stainless steel, although other metals or alloys and construction techniques may be used.

Figure 3:
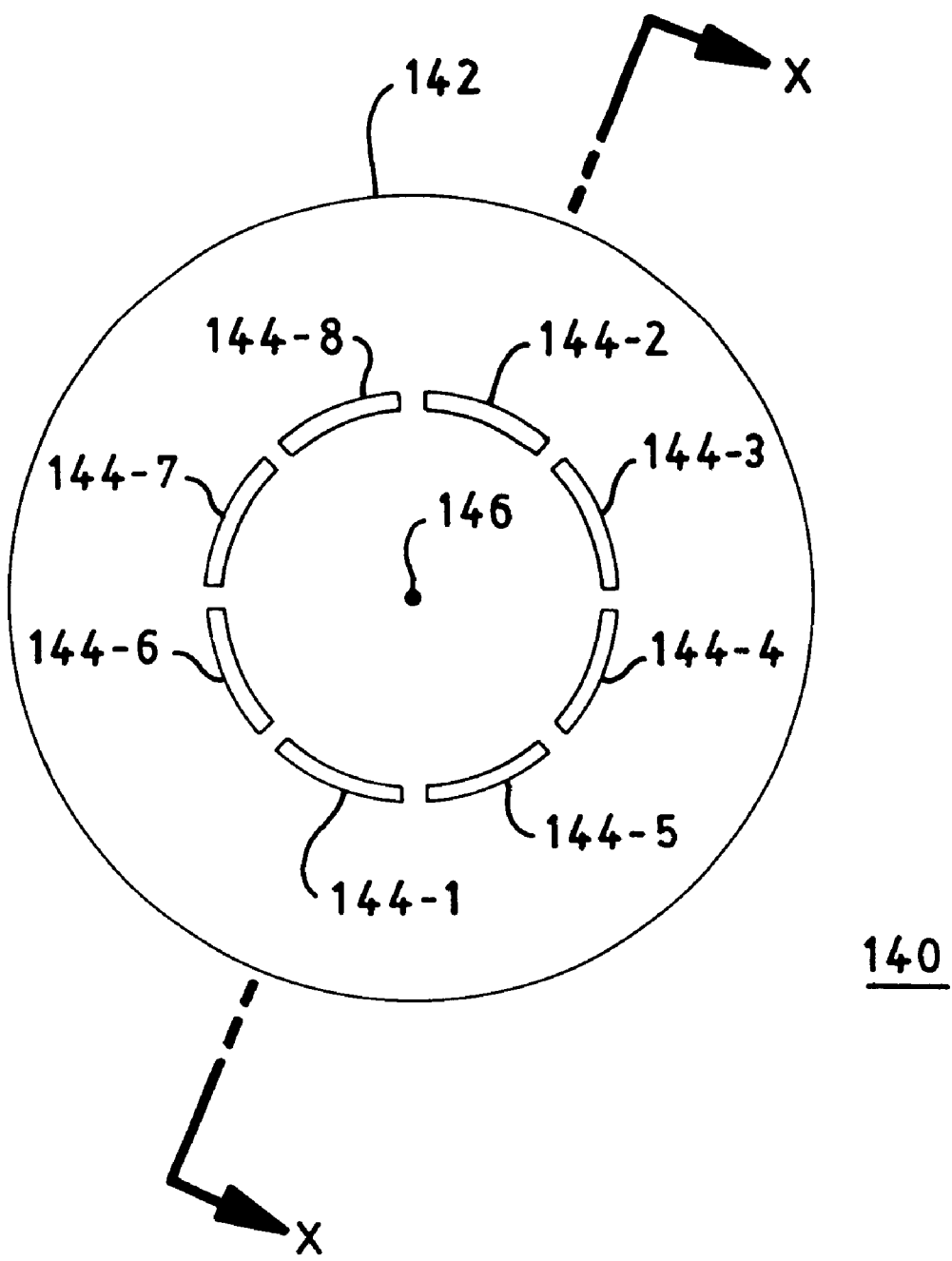
FIG. 3 shows a bottom view of the first electrode assembly of FIG. 2.

One form of the first electrode assembly 140 includes a relatively thin, nominally planar elastic member 142, and a plurality of elongated, rigid, petal electrodes 144-1 through 144-n extending from its bottom (as illustrated) surface. Although the illustrated embodiment depicts the petal electrodes extending substantially perpendicular to the bottom surface of the elastic member 142, other embodiments may include petal electrodes which extend from the elastic member surface at a one or more non-right angles. FIG. 3 shows a bottom view of first electrode assembly 140 apart from the rest of the invention, with eight petal electrodes (144-1 through 144-8). In the sectional view of FIG. 2, although only two petal electrodes 144-1 and 144-2 are shown, it is understood that a plurality of electrodes 144-1 through 144-n are present but not shown. In one form of the invention, the elastic member 142 may be made of stainless steel, having a thickness in the range of (0.002) to (0.2) inches. The elastic member 142 may be a stamped or machined metal plate, a metal foil, a non-conductive material having a conductive portion, for example, established by a deposited conductive film, or a completely non-conductive material. In an alternative embodiment, the elastic member may be nominally non-planar, for example convex or concave, or having concentric "ripples".

Figure 3A:
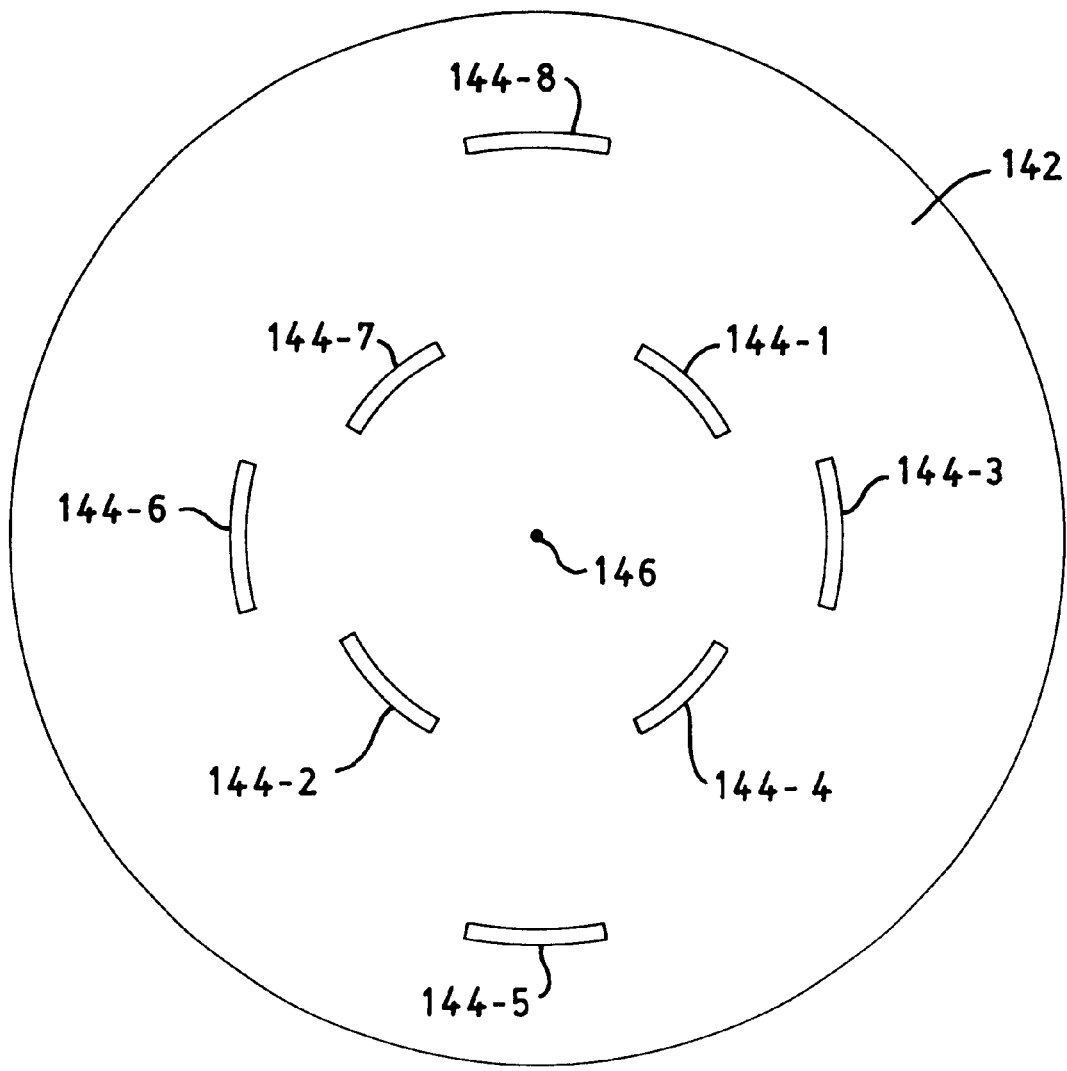
FIG. 3A shows a bottom view of the first electrode assembly of FIG. 2 with petal electrodes falling on various radii with respect to the central axis.

The plurality of petal electrodes 144 extend from the underside (as illustrated) of elastic member 142. When diaphragm is attached to surface 112 and only under certain pressure conditions, the petal electrodes 144 extend from the elastic member 142 in a direction substantially parallel to the first electrode central axis 146, from locations disposed symmetrically about the first electrode central axis 146. In one form of the invention, the locations from which the petal electrodes 144 extend are disposed about the central axis 146 at a radius which is less than the radius of the elastic member 142. In the embodiment of the invention depicted by FIG. 3, the petal electrodes 144 have the form of a hollow cylinder which has been sectioned length-wise into a plurality of electrodes. Each petal electrode has an arc-shaped cross section, where the cross section is defined by the intersection of the electrode by a plane which is perpendicular to the first electrode central axis 146. Those skilled in the art will appreciate that the petal electrodes may have other forms, such as rods having round cross section or bars having a rectangular cross section. The petal electrodes 144 are machined, cast, or attached to the elastic member 142 by gluing, welding, soldering, glass bonding, brazing, or by other means for attaching known to those skilled in the art. Alternatively, the locations on the elastic member 142 from which the petal electrodes 144 extend may fall on a plurality of radii about the central electrode central axis 146, whereby the distance from the central axis 146 to the surface of an petal electrode 144 may not be the same for all petal electrodes, as illustrated in FIG. 3A.

Figure 4:
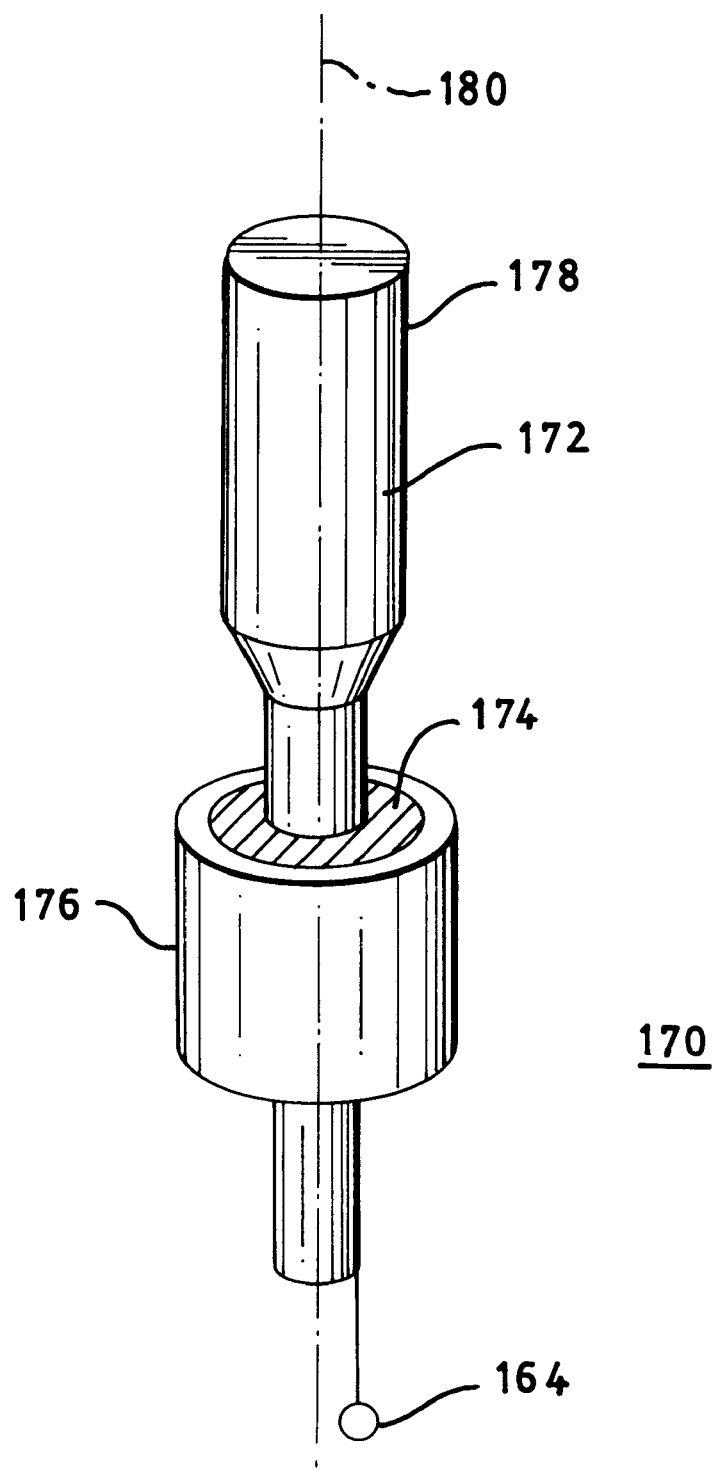
FIG. 4 shows a perspective view of one form of the second electrode assembly.

In one form of the invention, the second electrode assembly 170 includes a central electrode element 172 extending along a second electrode central axis 180, an insulating element 174 and a cylindrical collar 176. FIG. 4 shows a perspective view of the second electrode assembly 170.

The elastic member 142 of the first electrode assembly 140 is secured at its perimeter to the housing element 110 at the first aperture 114 by gluing, welding, glass bonding, soldering, brazing, or by other means for attaching known to those skilled in the art, in a manner such that the petal electrodes extending from the elastic member 142 are disposed symmetrically about housing central axis 116. Alternatively, the electrode assembly may be secured to the housing element 110 by pressure applied to the invention when the invention is installed in one of the invention's intended applications. In the exemplary illustration shown in FIG. 5, the side wall 210 of a high pressure extrusion chamber has a hole of diameter D1, and also has a larger, concentric hole with a diameter of D2 at a depth of T1. The transition within the side wall 210 where the diameter changes from D1 to D2 creates a shoulder 230. The larger hole with diameter D2 has threads 220 formed on the walls, and the housing element 110 has corresponding threads 240 on the outer surface. The first electrode assembly 140 is inserted into the hole with diameter D1, as shown in FIG. 5, so that the sealing surface 111 is in contact with the shoulder 230. In this form of the invention, the first electrode assembly 140 and the housing 110 both have a circular cross section in the plane perpendicular to the central axis 116. The threads 240 of the housing element 110 are engaged with the threads 220 of the hole of diameter D2, and the housing element 110 is inserted into the hole of diameter D2 by continued rotation of the housing element 110, until the sealing surface 111 of the housing element 110 presses against the shoulder 230 of the side wall 210.

In general, the first electrode assembly 140 is joined to the housing element 110 by aforementioned means for attaching known to those in the art, so that the housing central axis 116 is substantially parallel to the first electrode central axis 146, although other orientations may be used to produce unique relationships between the deflection of the elastic member 142 and the capacitance between the first electrode assembly 140 and the second electrode assembly 170.

After the first electrode assembly 140 is attached to the housing element 110, the second electrode assembly 170 is assembled and attached to the housing element 110. Initially, the central electrode 172 is fixedly secured in concentric configuration with the housing element 110 by insulating element 174. The cylindrical collar 176 of the electrode assembly 170 is then positioned into the second aperture 118 of the housing element 110 so that the conductive surface 178 of the central electrode 172 is uniformly spaced apart from the petal electrodes 144 and the central electrode 172 overlaps the petal electrodes 144 along the central axis 146 by a predetermined distance. The cylindrical collar 176 is secured to the housing element 110 by gluing, welding soldering, brazing or other means known to those in the art to the housing element 110, so that the second electrode central axis 180 is substantially parallel to the housing central axis 116, although other orientations may be used to produce unique relationships between the elastic member 142 deflection and the capacitance between the first electrode assembly 140 and the second electrode assembly 170. Details and alternate methods of assembling the electrode and securing it to the housing element 110 are disclosed in U.S. Pat. No. 5,442,962, which is incorporated by reference herein.

Figure 6A:
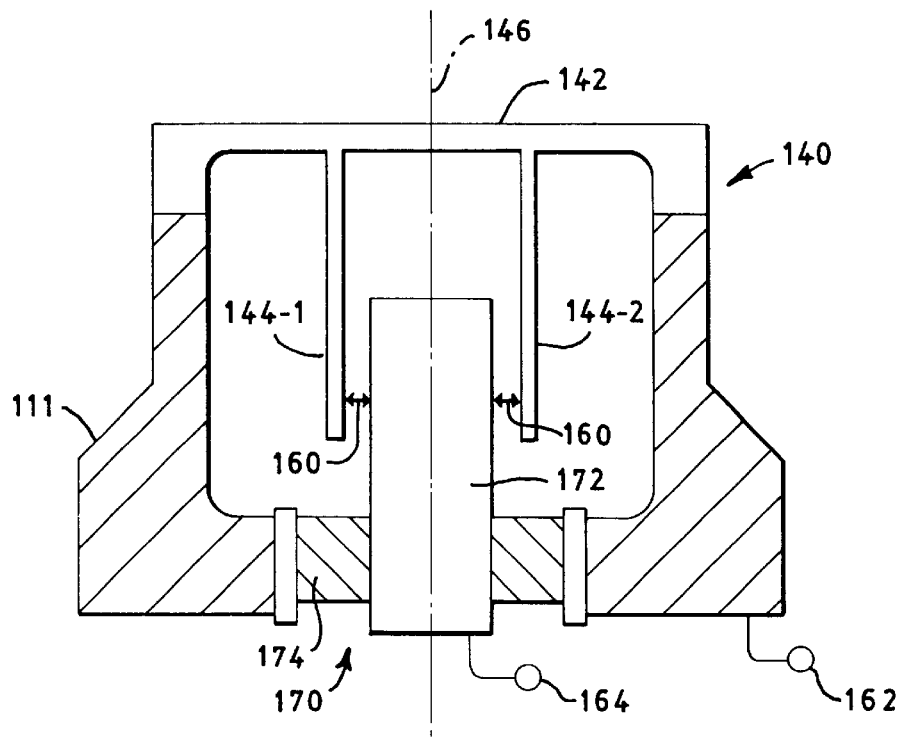
FIG. 6A shows a sectional view of the first electrode assembly and how it is related to the second electrode assembly, before the elastic member deflects.
Figure 6B:
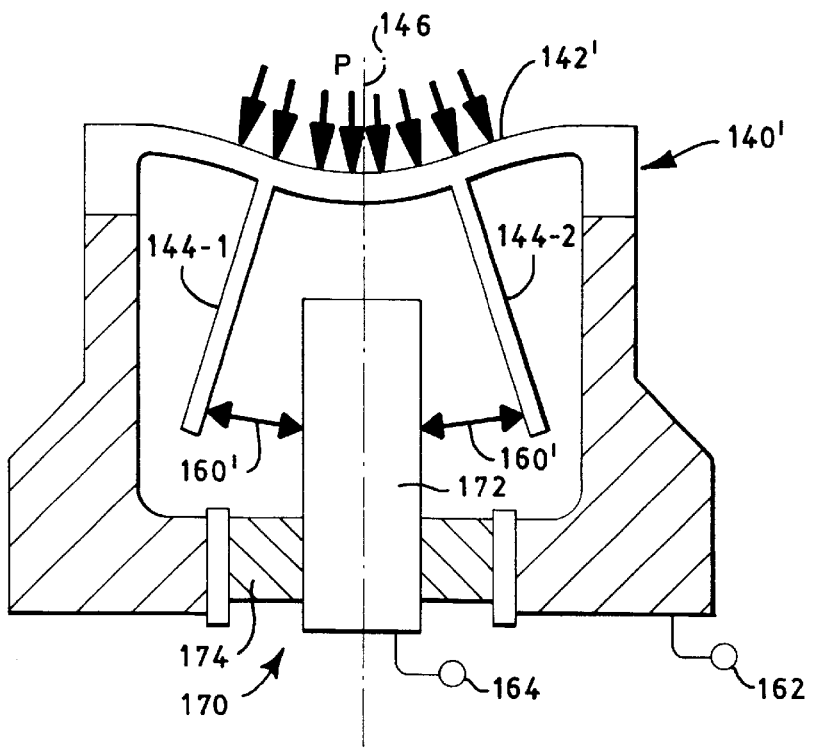
FIG. 6B shows a sectional view of the first electrode assembly and how it is related to the second electrode assembly, as the elastic member deflects.

With the above described configuration, a capacitive pressure sensor is established, whereby the capacitance between the first electrode assembly 140 and the second electrode assembly 170 is related to the pressure applied to one side of the elastic member 142. The central electrode element 172 and the plurality of petal electrodes 144 effectively form a plurality of capacitors in parallel, so that the total capacitance between the first electrode assembly 140 and the second electrode assembly 170 is the sum of the individual capacitors. As pressure is applied to the sensor 100, the elastic member 142 deflects, causing the petal electrodes 144 to spread and move away from the central electrode element 172, thereby decreasing the total capacitance between the first electrode 140 and the second electrode 170. FIG. 6A shows a sectional view of the relationship between the first electrode assembly 140 and the second electrode assembly 170 in an undeflected condition with initial capacitive gap 160. FIG. 6B shows a sectional view of the relationship between the first electrode 140' and the second electrode 170 as the elastic member 142' deflects under pressure P applied to surface opposite petal electrodes. The deflection view in FIG. 6B has been intentionally exaggerated in order to illustrate the positional change in the petal electrodes 144-1 and 144-2 with respect to the second electrode 170 resulting in capacitive gap change 160' that decreases total capacitance. In operation, the actual deflection and associated positional change in the petal electrodes is so small as to be nearly imperceptible. In FIGS. 6A and 6B, the first electrode central axis 146 and the second electrode central axis are collinear. The portions of FIG. 6A represent the invention prior to deflection of the elastic member 142, and the portions of FIG. 6B represent the deflection view, i.e., the invention after deflection of the elastic member 142' due to applied pressure P.

Figure 7A:
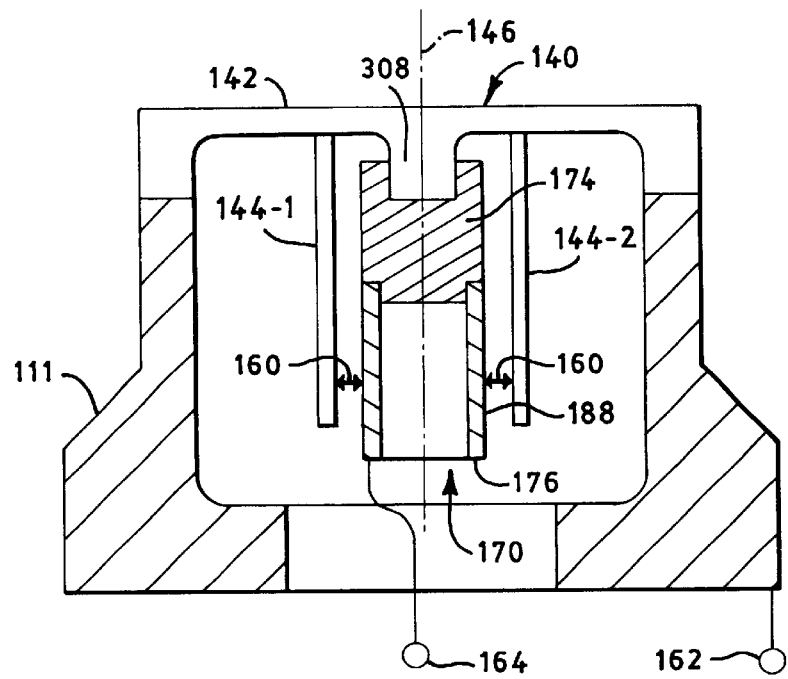
FIG. 7A shows a sectional view of the first and second electrode assemblies in another form of the invention, before the elastic member deflects.
Figure 7B:
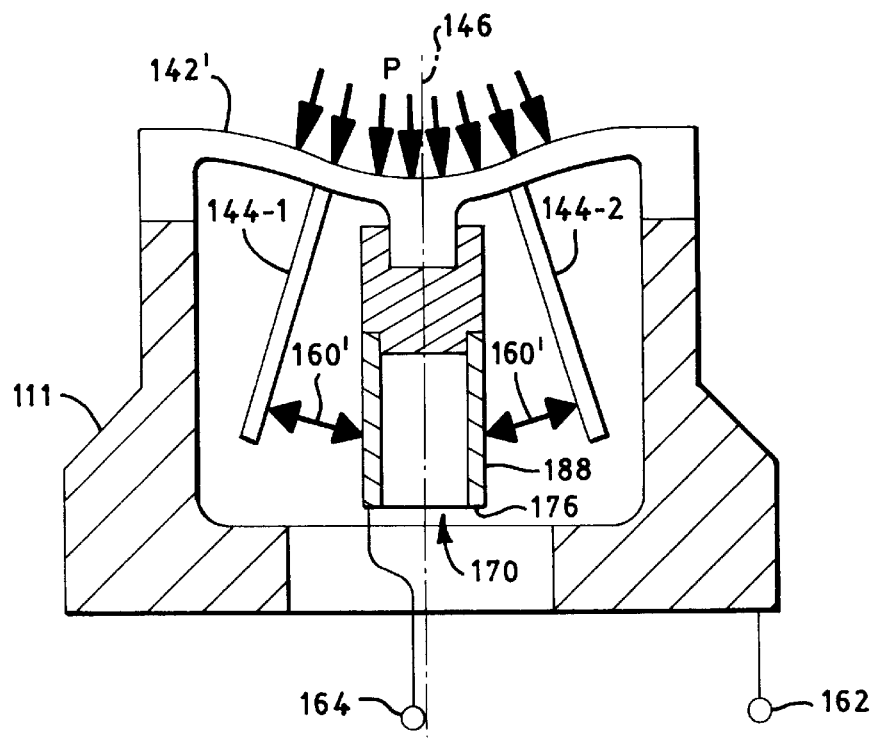
FIG. 7B shows a sectional view of the first and second electrode assemblies in another form of the invention, as the elastic member deflects.

In another form of the invention, as shown in the undeflected sectional view of FIG. 7A, the second electrode assembly 170 is attached to the elastic member 142, so that the second electrode central axis 180 is substantially parallel to the first electrode central axis 146. In this form of the invention, the cylindrical collar 176 has a conductive outer surface 188, and the capacitors are formed between the petal electrodes 144-1 and 144-2 and the exterior surface 188 of the cylindrical collar 176 due to capacitive gap 160 in undeflected condition. FIG. 7B shows a sectional view of the relationship between the first electrode 140' and the second electrode 170 as the elastic member 142' deflects under pressure P applied to surface opposite petal electrodes. The deflected view of FIG. 7B is exaggerated to illustrate change in capacitive gap 160' which decreases the total capacitance between the petal electrodes 144 and the cylindrical collar 176.

Figure 8:
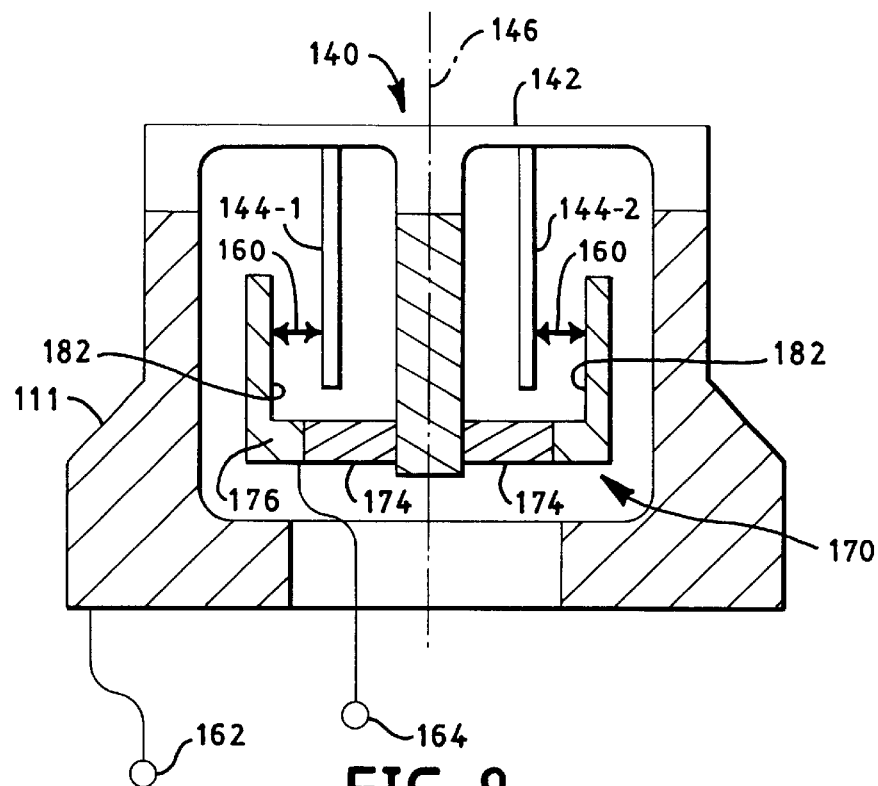
FIG. 8 shows a sectional view of the first electrode assembly and the second electrode assembly in yet another form of the invention.

In yet another form of the invention, as shown in sectional view of FIG. 8, the second electrode assembly 170 is attached to the elastic member 142, so that the second electrode central axis 180 is substantially parallel to the first electrode central axis 146. In this form of the invention, the cylindrical collar 176 has the form of a cup, so that the cylindrical collar 176 extends out and around the petal electrodes 144-1 and 144-2 The inside surface 182 of the cylindrical collar 176, i.e., the surface which faces the petal electrodes 144-1 and 144-2, is conductive. In this form of the invention, as the elastic member 142 deflects, as a result of pressure applied along the first electrode axis 146 upon the surface of the elastic member without the petal electrodes, the petal electrodes 144-1 and 144-2 move closer to the conductive surface 182 of cylindrical collar 176 decreasing the capacitive gap 160, which increases the total capacitance between the petal electrodes 144-1 and 144-2 and the cylindrical collar 176.

Figure 9:
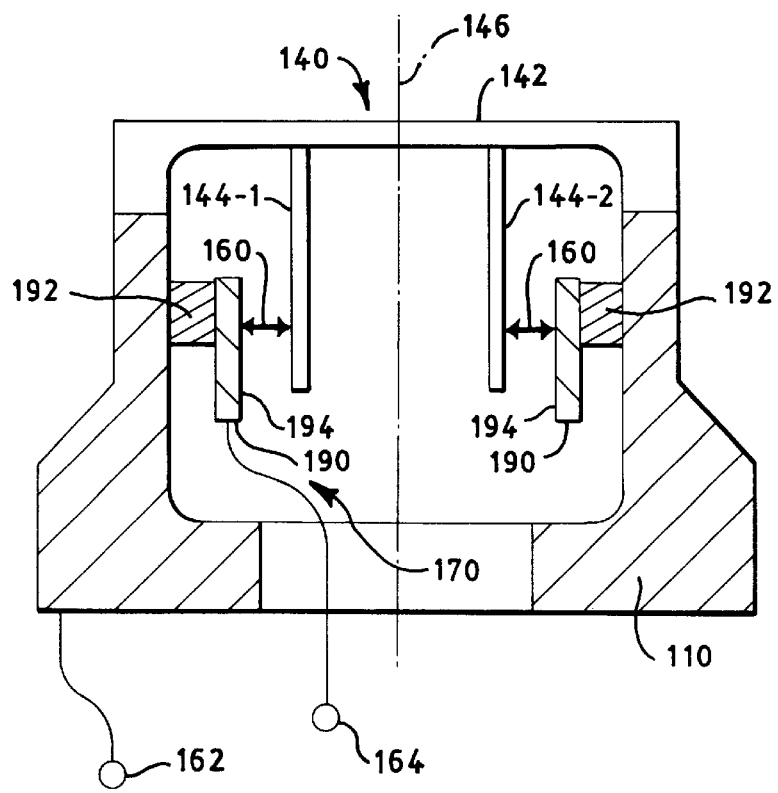
FIG. 9 shows a sectional view of the first electrode assembly and the second electrode assembly of another form of the invention.

In yet another form of the invention, the second electrode assembly 170 includes a two concentric rings. The inner concentric ring 190 has a conductive surface 194. The outer concentric ring 192 is non-conductive, attaches to the inside of the housing element 110, and surrounds the petal electrodes 144-1 and 144-2, as shown in the sectional view of FIG. 9. As the elastic member 142 deflects, as a result of pressure applied along the first electrode axis 146 upon the surface of the elastic member without the petal electrodes, the petal electrodes 144-1 and 144-2 move closer to the conductive surface 194 of the second electrode assembly 170 decreasing the capacitive gap 160, which increases the total capacitance between the first electrode assembly 140 and the second electrode assembly 170.

Figure 10:
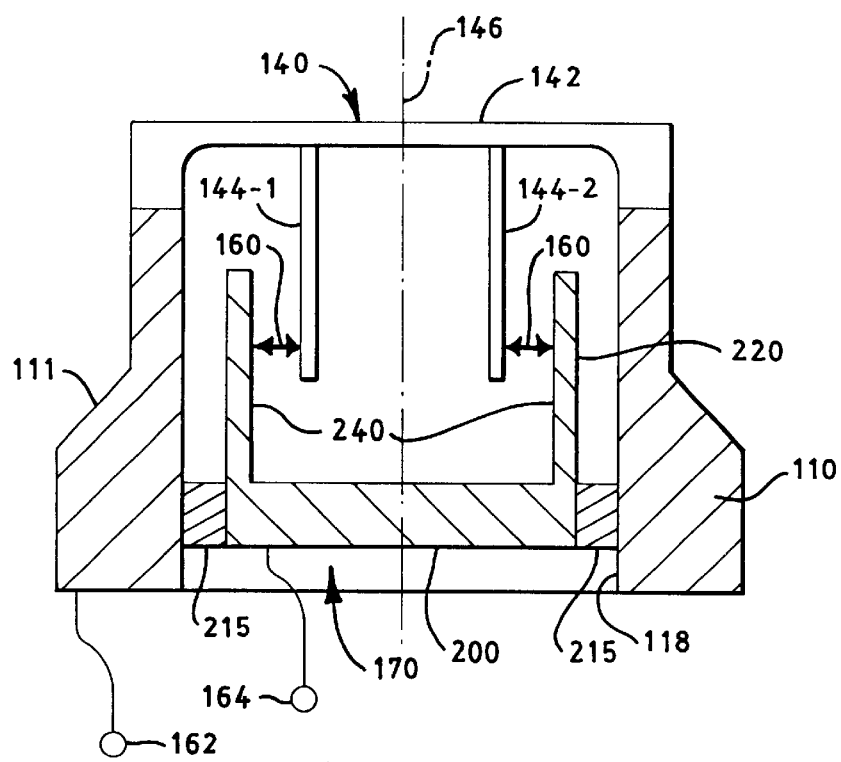
FIG. 10 shows a sectional view of the first electrode assembly and the second electrode assembly of another form of the invention.
Figure 11:
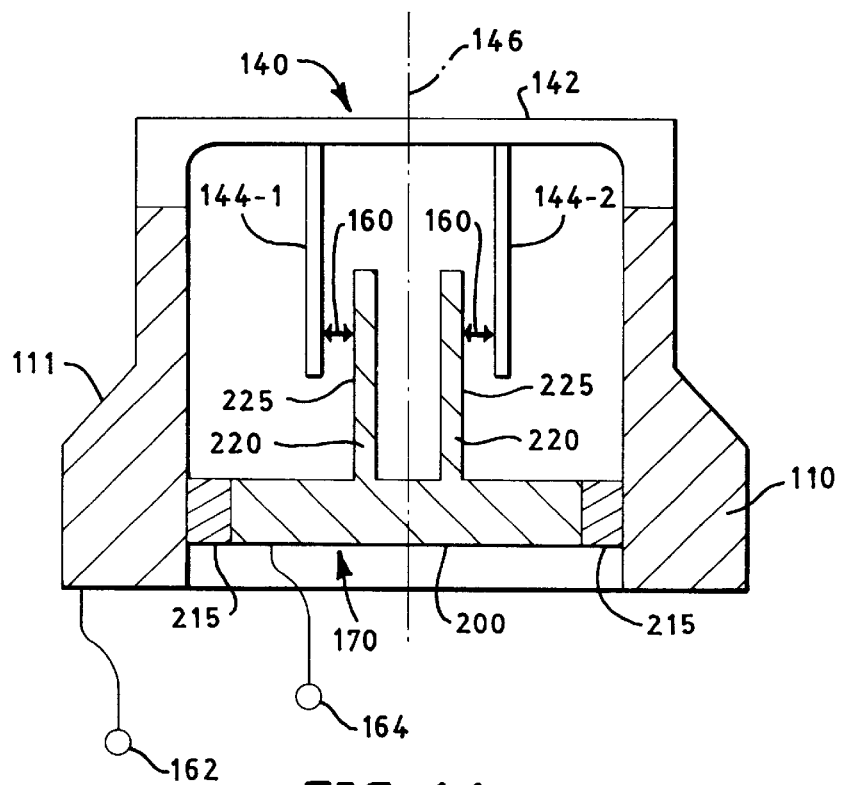
FIG. 11 shows a sectional view of the first electrode assembly and an alternative embodiment of the second electrode assembly of FIG. 10.

In another form of the invention, the second electrode assembly 170 includes a conductive cup element 220 with a conductive inner surface 240, an electrically conductive base plate 200 and an insulating ring 215 attached to the outer edge of the base plate 200. As shown in the sectional view of FIG. 10, the second electrode assembly 170 attaches to the housing element 110 at the second aperture 118. The insulating ring 215 electrically isolates the base plate 200 and the cup element 220 from the housing element 110. In this form of the invention, when the elastic member 142 deflects, as a result of pressure applied along the first electrode axis 146 upon the surface of the elastic member without the petal electrodes, the petal electrodes 144-1 and 144-2 move closer to the conductive inner surface 240 of the cup element 220 decreasing the capacitive gap 160, which increases the total capacitance between the first electrode assembly 140 and the second electrode assembly 170. In an alternative embodiment, the outer diameter of the cup element 220 is less than that shown in FIG. 10, so that the cup element 220 is disposed within the petal electrodes 144-1 and 144-2, as shown in FIG. 11. In this embodiment, when the elastic member 142 deflects as a result of pressure applied along the first electrode axis 146 upon the surface of the elastic member without the petal electrodes, the petal electrodes 144-1 and 144-2 move away from the outer conductive surface 225 of the cup element 220 increasing the capacitive gap 160, which decreases the total capacitance between the first electrode assembly 140 and the second electrode assembly 170.

Figure 12:
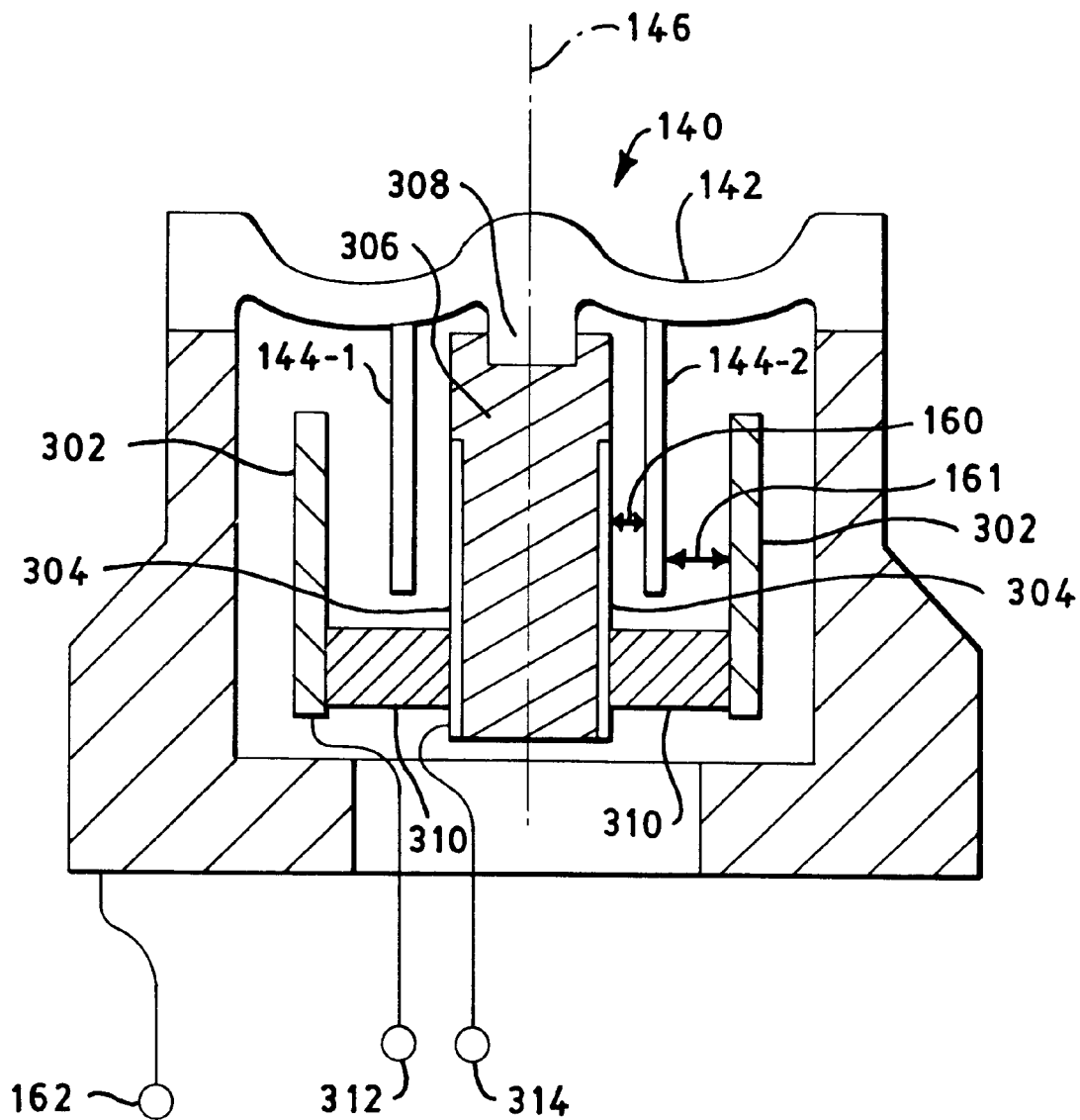
FIG. 12 shows a sectional view of another embodiment of the invention with a second conductor having dual conductive surfaces.

In another embodiment of the invention shown in the sectional view of FIG. 12, the second electrode assembly 170 includes two conductive surfaces; the first conductive surface 302 is disposed outside of the petal electrodes and the second conductive surface 304 is disposed within the petal electrodes. The second conductive surface 304 is disposed upon an insulating post 306, and the insulating post 306 is secured to a mounting post 308 on the elastic member 142. An insulating ring 310 is attached to the insulating post 306, and the first conductive surface 302 is attached to the insulating ring 310. Such a configuration, illustrated in FIG. 12, provides a "push-pull" capacitive effect, as exemplified by the sensors set forth in U.S. Pat. Nos. 4,386,312 and 4,054,833, assigned to the assignee of the present invention. As the elastic member 142 deflects and the petal electrodes 144 spread apart, the capacitance between each of the petal electrodes 144, and the first conductive surface 302 increases while the capacitance between the petal electrodes and the second conductive surface 304 decreases. In this embodiment, a first electrode terminal 162 is electrically coupled to the petal electrodes 144, a second electrode terminal 312 is electrically coupled to the first conductive surface 302 and a third electrode terminal 314 is electrically coupled to the second conductive surface 304. All three terminals, 162, 312 and 314 are external to the sensor housing 110 so that the corresponding capacitances may be measured external to the housing 110. FIG. 12 depicts a center mount style of this configuration, wherein the second electrode assembly is physically connected to, yet insulated from, the diaphragm assembly. Alternate embodiments of this configuration may include a second electrode assembly having dual conductive surfaces as shown in FIG. 12, wherein the second electrode assembly mounts to the housing, as exemplified by FIGS. 10 and 11.

All of the embodiments described herein utilize a second electrode element which has a continuous conductive surface opposite the petal electrodes of the first electrode element. Those skilled in the art will recognize that the conductive surface of the second electrode element may include a plurality of conductive surfaces, all electrically connected just as the petal electrodes are electrically connected to each other. The number of conductive surfaces in the second electrode element may be less than, greater than or equal to the number of petal electrodes.

The present embodiments are therefore to be considered in all respects as illustrative and not restrictive, the scope of the invention being indicated by the appended claims rather than by the foregoing description, and all changes which come within the meaning and band of equivalency of the claims are therefore intended to be embraced therein.

What is claimed is:

1. A capacitive sensor comprising:
   A. a first electrode assembly including:
      i. an elastic member disposed about and extending transverse to a central axis, and said elastic member having a first principal surface and a second principal surface on opposite sides thereof bounded by a peripheral portion of the elastic member,
      ii. one or more elongated petal elements, each of said petal elements connected to and extending in a direction at least in part perpendicular to said first principal surface from points on said first principal surface disposed about said central axis and said petals including an electrically conductive region at points distal from said first principal surface,
   B. a second electrode assembly including an electrically conductive element extending along an electrode axis,
   C. a support structure for fixedly supporting said peripheral portion of said elastic member with respect to said electrically conductive element of the second electrode assembly, whereby said central axis and said electrode axis are collinear and said conductive element is disposed opposite to and spaced apart from said conductive regions of said petal elements.

2. A capacitive sensor according to claim 1 wherein said support structure comprises:
   a housing extending about said central axis and having an aperture at a first end, said aperture defined by a substantially annular surface in a housing plane perpendicular to said central axis, wherein said elastic member spans said aperture with said peripheral portion being fixedly attached to said annular surface to define an enclosed volume interior to said housing, whereby said elastic member is nominally co-planar with said housing plane and said petal elements extend into said enclosed volume.

3. A capacitive sensor according to claim 2, wherein said second electrode assembly is supported by said housing.

4. A capacitive sensor according to claim 2 wherein said second electrode assembly is supported by portions of said elastic member at and disposed about said central axis.

5. A capacitive sensor according to claim 1 wherein each of said petal elements is a cylindrical section disposed about and extending along said central axis.

6. A capacitive sensor according to claim 3 wherein said second electrode assembly includes a cylindrical element extending along said central axis and forming said conductive portion.

7. A capacitive sensor according to claim 6 further comprising means for fixedly supporting said cylindrical element with respect to the peripheral portion of said elastic member.

8. A capacitive sensor according to claim 6 wherein said cylindrical element extends from portions of said elastic member at and disposed about said central axis.

9. A capacitive sensor according to claim 1 wherein said electrically conductive element of said second electrode assembly is farther from said central axis than said conductive elements of said petal electrodes.

10. A capacitive sensor according to claim 9 further comprising means for fixedly supporting said electrically conductive element with respect to the peripheral portion of said elastic member.

11. A capacitive sensor according to claim 9 wherein said electrically conductive element extends from portions of said elastic member at and disposed about said central axis.

12. A capacitive sensor according to claim 1 wherein said electrically conductive element of said second electrode assembly is closer to said central axis than said conductive elements of said petal electrodes.

13. A capacitive sensor according to claim 12 wherein said electrically conductive element extends from portions of said elastic member at and disposed about said central axis.

14. A capacitive sensor according to claim 12 further comprising means for fixedly supporting said electrically conductive element with respect to the peripheral portion of said elastic member.

15. A capacitive sensor according to claim 1 wherein said elastic member has a substantially uniform thickness.

16. A capacitive sensor according to claim 1 wherein said elastic member has a thickness profile which varies with distance from said central axis.

17. A capacitive sensor according to claim 1, wherein said second electrode assembly includes a first conductive surface disposed nearer to said electrode axis than said elongated petal elements, and a second conductive surface disposed further from said electrode axis than said elongated petal elements.

18. A capacitive sensor comprising:
   A. a rigid housing element disposed about a central axis, said housing element having at one end an aperture extending about said central axis in a first plane substantially perpendicular to said central axis;
   B. a first electrode assembly, including
      i) an elastic member lying in a second plane substantially perpendicular to a first electrode assembly axis, said elastic member having a peripheral portion;
      ii) at least one elongated petal electrode, connected to and axially extending from said elastic member from locations disposed about said first electrode assembly axis, and being substantially parallel to said first electrode assembly axis;
      wherein said elastic member spans said aperture and said peripheral portion of said elastic member is fixedly attached to said housing element, so that said first electrode assembly axis is substantially parallel to said central axis and said elongated petal electrodes are within said housing element; and
   C. a second electrode assembly, including a central electrode extending along a second electrode assembly axis collinear with said central axis, said central electrode having an electrically conductive surface substantially parallel to said second electrode assembly axis, said surface being disposed about said second electrode assembly axis; whereby said electrically conductive surface is in proximity to and opposite said elongated petal electrodes.

19. A capacitive sensor according to claim 18, wherein said electrically conductive surface of said central electrode is substantially uniformly spaced apart from the said elongated petal electrodes.

20. A capacitive sensor according to claim 18, wherein a first cross section of said elastic member, defined by an intersection of said elastic member with said second plane, is substantially circular having a first radius.

21. A capacitive sensor according to claim 20, wherein said locations on said elastic member from which said elongated petal electrodes extend are disposed about said second axis at a predetermined radius.

22. A capacitive sensor according to claim 21, wherein said predetermined radius is less than said first radius.

23. A capacitive sensor according to claim 20, wherein said locations on said elastic member from which said elongated petal electrodes extend are successively disposed about said second axis at alternating radii.

24. A capacitive sensor according to claim 20, wherein said elastic member has a second cross section, defined by an intersection with a third plane, said third plane being perpendicular to said second plane, said second cross section being substantially rectangular.

25. A capacitive sensor according to claim 24, wherein said second cross section tapers from a maximum thickness at said peripheral portion to a minimum thickness at said locations where said elongated petal electrodes extend from said elastic member.

26. A capacitive sensor according to claim 18, wherein said housing element further includes a second aperture extending about said central axis at a third radius in a fourth plane substantially perpendicular to said central axis and apart from first plane, said second electrode further includes:

A. a cylindrical collar substantially concentrically disposed about said central electrode;

B. a dielectric material rigidly coupling said first electrode to said cylindrical collar; and, said means for positioning said second electrode assembly includes the following steps:

I) position said cylindrical collar in said second aperture, wherein said central electrode's conductive surface is uniformly spaced apart from said elongated petal electrodes and overlaps said elongated petal electrodes along said central axis by a predetermined distance;

ii) rigidly couple said first cylindrical collar to said first base aperture, maintaining said conductive surface of said central electrode at said uniform space apart from said elongated petal electrodes.

27. A capacitive sensor according to claim 18, wherein at least a portion of said elongated petal electrodes overlaps said central electrode along said central axis.

28. A capacitive sensor according to claim 18, wherein said elastic member is electrically conductive.

29. A capacitive sensor according to claim 18, wherein said second electrode assembly includes a first conductive surface disposed nearer to said central axis than said elongated petal electrodes, and a second conductive surface disposed further from said central axis than said elongated petal electrodes.

* * * * *